MEANS FOR AUDIBLY REPRODUCING PRINTED DATA

Filed Aug. 18, 1959 7 Sheets-Sheet 1

INVENTOR
John Hancock Davis
BY
ATTORNEY

MEANS FOR AUDIBLY REPRODUCING PRINTED DATA

Filed Aug. 18, 1959 7 Sheets-Sheet 2

INVENTOR

BY

ATTORNEY.

INVENTOR
John Hancock Davis
BY
A. Yates Dowell
ATTORNEY.

MEANS FOR AUDIBLY REPRODUCING PRINTED DATA

Filed Aug. 18, 1959 7 Sheets-Sheet 4

BY

A. Yates Dowell
ATTORNEY.

INVENTOR
John Hancock Davis
BY
[signature]
ATTORNEY.

INVENTOR
John Hancock Davis
BY
[signature]
ATTORNEY

INVENTOR
John Hancock Davis
BY
ATTORNEY 3,114,980
MEANS FOR AUDIBLY REPRODUCING PRINTED DATA John Hancock Davis, 76 Farquhar Road, Edgbaston, Birmingham, England Filed Aug. 18, 1959, Ser. No. 834,538
13 Claims. (Cl. 35—35)

This invention relates to a new or improved apparatus which is adapted to read aloud from letter-press or perform other actions such as word-for-word translation from one language to another, or letter-for-letter transliteration from one alphabet to another.

The general object of the invention is to provide an apparatus of the character described which will operate as a substitute for the mental process and physical action hitherto ordinarily performed by a human being assimilating visually the intelligence recorded as letter-press. Possible uses of the apparatus include operation of relays in setting up electronic calculators and/or data processing such as preparation of punched cards or tapes as well as transcription of sheets bearing figures in numeral form as for example checks or money orders.

The expression letter-press as used herein is to be deemed to mean any form capable of being read visually, and in particular includes any word, symbol or group of symbols pertaining to any language printed, typed or written (provided that it is written with the requisite degree of standardisation as to configuration which will enable the apparatus to operate) embossed, indented, perforated or otherwise impressed upon a sheet or other suitable record member so as to present a distinctive visual appearance and includes any like intelligence impressed in a braille (or equivalent alphabet) upon a record sheet presenting a distinctive sensation upon touch.

A more specific object of the invention is the provision of an apparatus of the kind specified, one form of which can be used for reading aloud to blind persons from printed or typed letter-press and another form of which can be used for the benefit of blind persons to effect transliteration from visually readable printed or typed letter-press to braille. The expression "reading aloud" is to be deemed to include audible reproduction from a loud speaking instrument or from an instrument individual to the user of the apparatus such as head phones.

According to the invention apparatus for reading aloud or performing actions responsive to letter press comprises a photo-sensitive scanning means including means for forming a scanning spot of a size substantially smaller than a letter-press unit to be scanned, and means for imparting a plurality of successive scanning traces to said spot each traversing a respective elemental part of said letter-press unit, means for producing in response to said scanning traces successive electrical signals pertaining to said elemental parts respectively and collectively forming in respect of a series of letter-press units a primary electrical output comprising successive primary signal groups pertaining to respective letter-press units and each having a complex form involving a plurality of amplitude variations within a time interval equal to the scanning time for each complete scan of a letter-press unit, a conversion device responsive to said primary electrical output to produce a secondary electrical output comprising successive portions each derived from a respective primary signal group and co-related with each other by a parameter, said parameter being variable and sustained at a particular value in respect of each of said portions of said secondary electrical output for a time substantially greater than that for which any amplitude level of said primary signal is sustained, and action performing means including a plurality of different potentially active action performing devices, and including selector means responsive to variation of said parameter to determine which of said action performing devices are rendered active.

The conversion device may include means for establishing a secondary electrical output comprising a series of successive portions each sustained at an amplitude level unique to a particular respective letter-press unit and determined by the complex wave-form presented by the particular primary signal group generated by said letter-press unit, the selector means in this case being responsive to the amplitude of each of said portions of said secondary electrical output. Thus it would be within the scope of the invention, and it is contemplated, that the conversion device could include an integrator circuit providing an output which is a function of the dark or light coloured area of the letter-press unit scanned. Discrimination as between one letter-press unit and another would thus be achieved by making use of the different areas presented thereby.

In a preferred form of the apparatus, however, the conversion device makes use of the fact that the complex wave-form presented by each primary signal group is equivalent analytically to a sine wave of fundamental frequency, together with a number of higher harmonics and that the amplitude of the latter may be either zero (in which case the harmonic concerned is not present at all), or have a value which is characteristic of a particular letter-press unit. The fundamental and harmonics collectively provide a source of information which enables the conversion device to discriminate between one letter-press unit and another and provide a simplified useable output which is capable of controlling the action performing means.

Thus in this form of the invention the conversion device includes frequency analyser means comprising a plurality of analyser units sensitive to the presence of respective frequencies in said primary electrical output, said conversion device further including aggregator means comprising a plurality of reception units connected with respective analyser units to receive the outputs therefrom and themselves furnishing respective outputs of a magnitude such that different combinations of these last said outputs always produce a secondary electrical signal portion which is unique in magnitude so that it can be used either alone or in combination with similarly derived signal portions to select a particular letter-press unit.

The invention will now be described with reference to the accompanying drawings illustrating by way of example specific embodiments of the invention and wherein.

Figures 9, 9A:
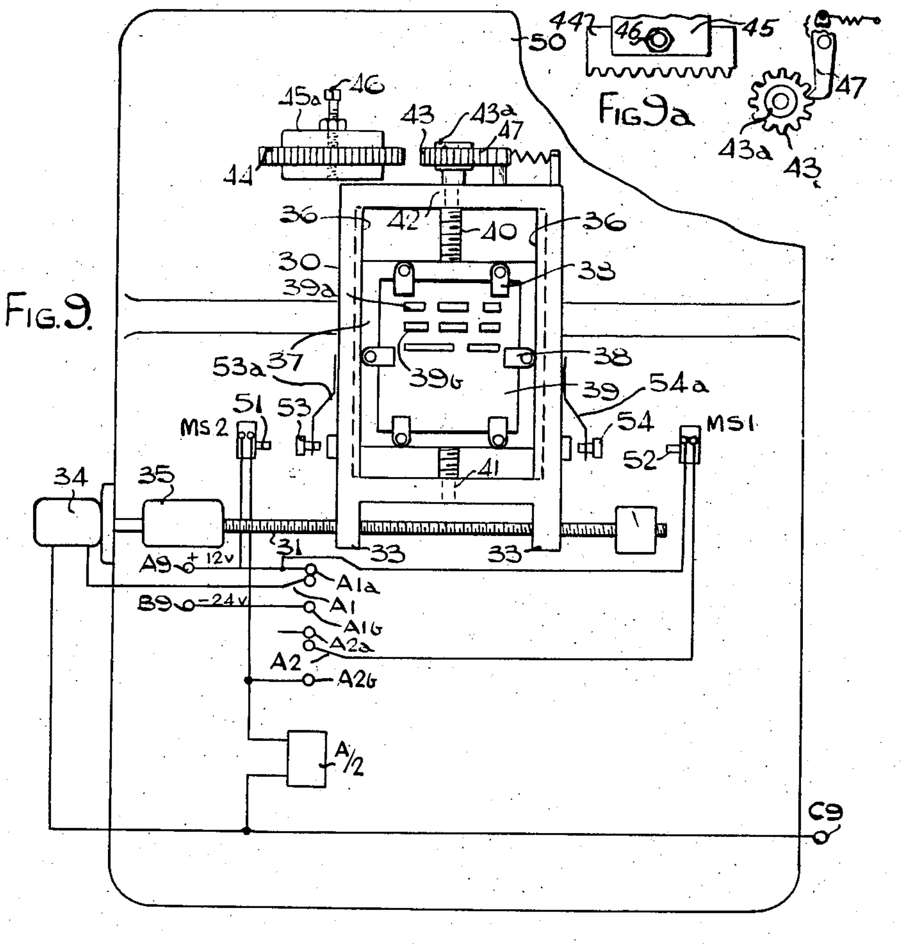

FIGURES 9 and 9*a* show an arrangement for supporting and feeding the text undergoing reading by means of the apparatus.

Figure 5:
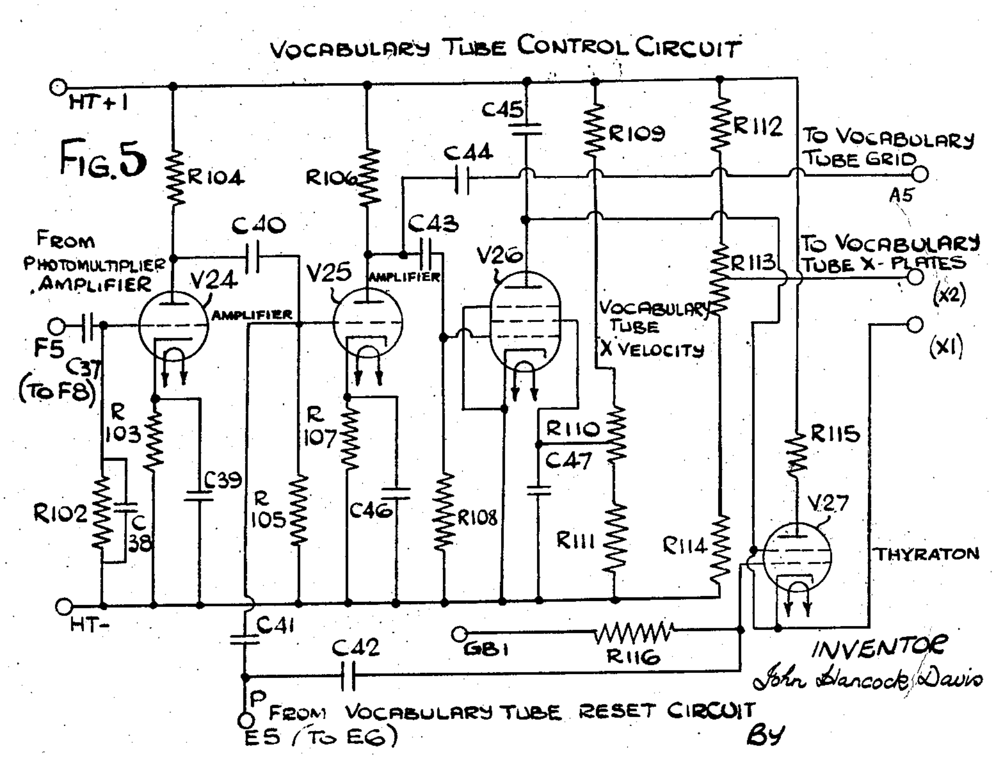
FIGURE 5 is a circuit diagram of the vocabulary tube control circuit.
Figure 11:
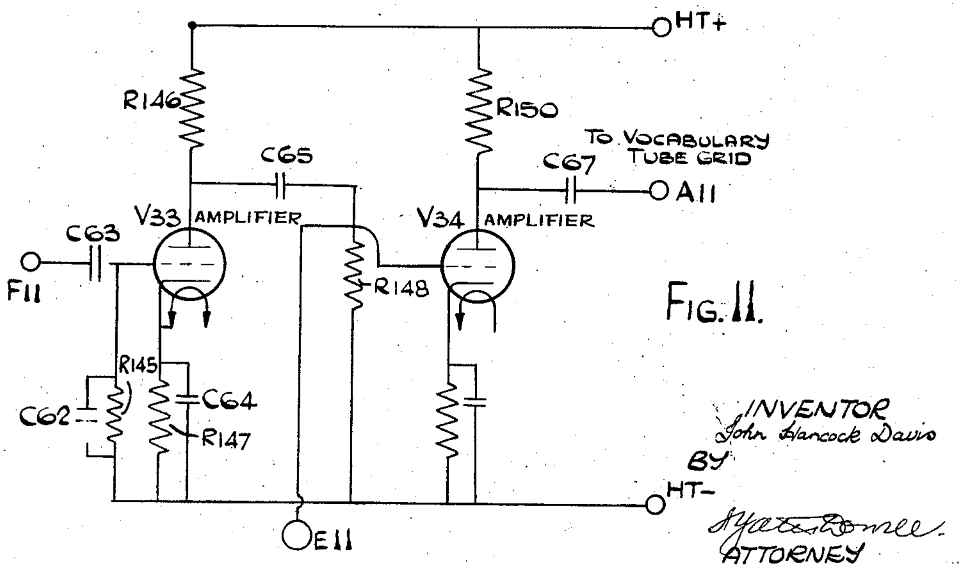
Figure 10:
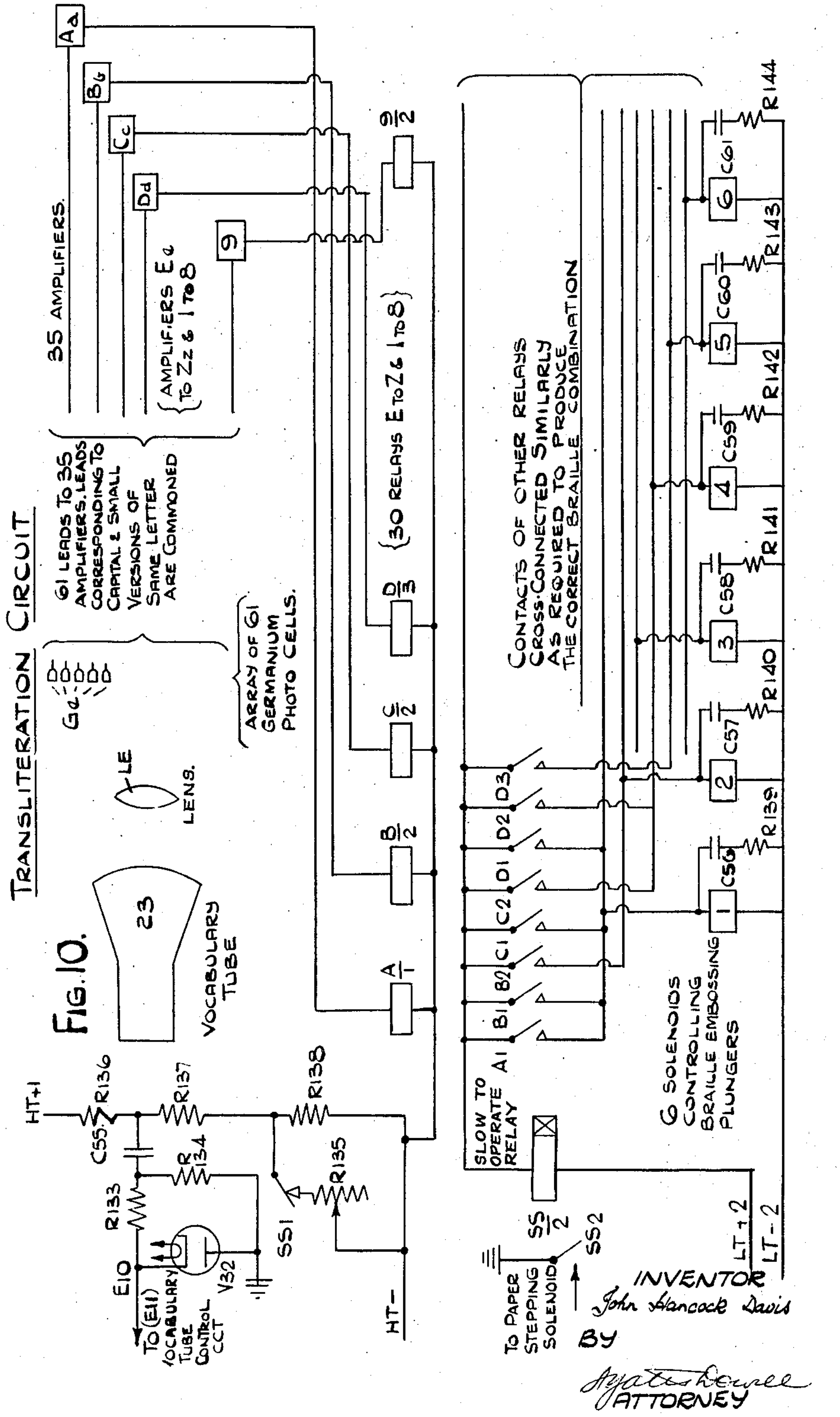

FIGURE 10 is a simplified circuit diagram of an alternative form of action performing means applicable to the apparatus when the latter is required to perform transliteration from a visually readable letter-press unit into braille, and FIGURE 11 is a modified form of the vocabulary tube control circuit to be used in substitution for that shown in FIGURE 5 when the apparatus includes the action performing means shown in FIGURE 10.

Figures 1, 1A, 2:
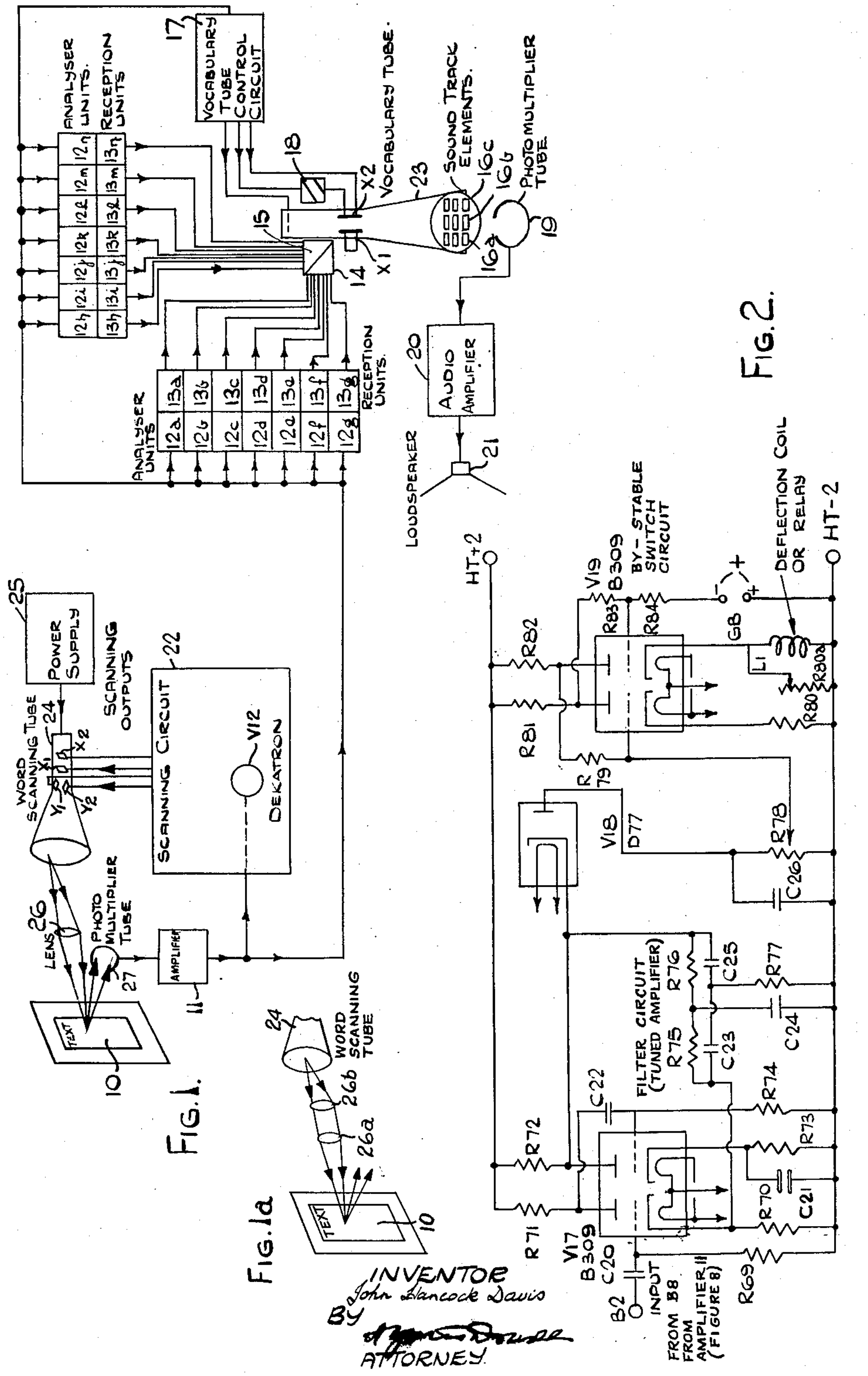
FIGURE 1 is a simplified circuit diagram illustrating the connections between the various units and assemblies of the apparatus, these units or assemblies themselves being shown in block form or as simplified representations.
FIGURE 1A is a fragmentary view showing a modification of the lens provided between the word scanning tube and the text.
FIGURE 2 is a circuit diagram of one of the analyser units and its associated reception unit.
Figure 3:
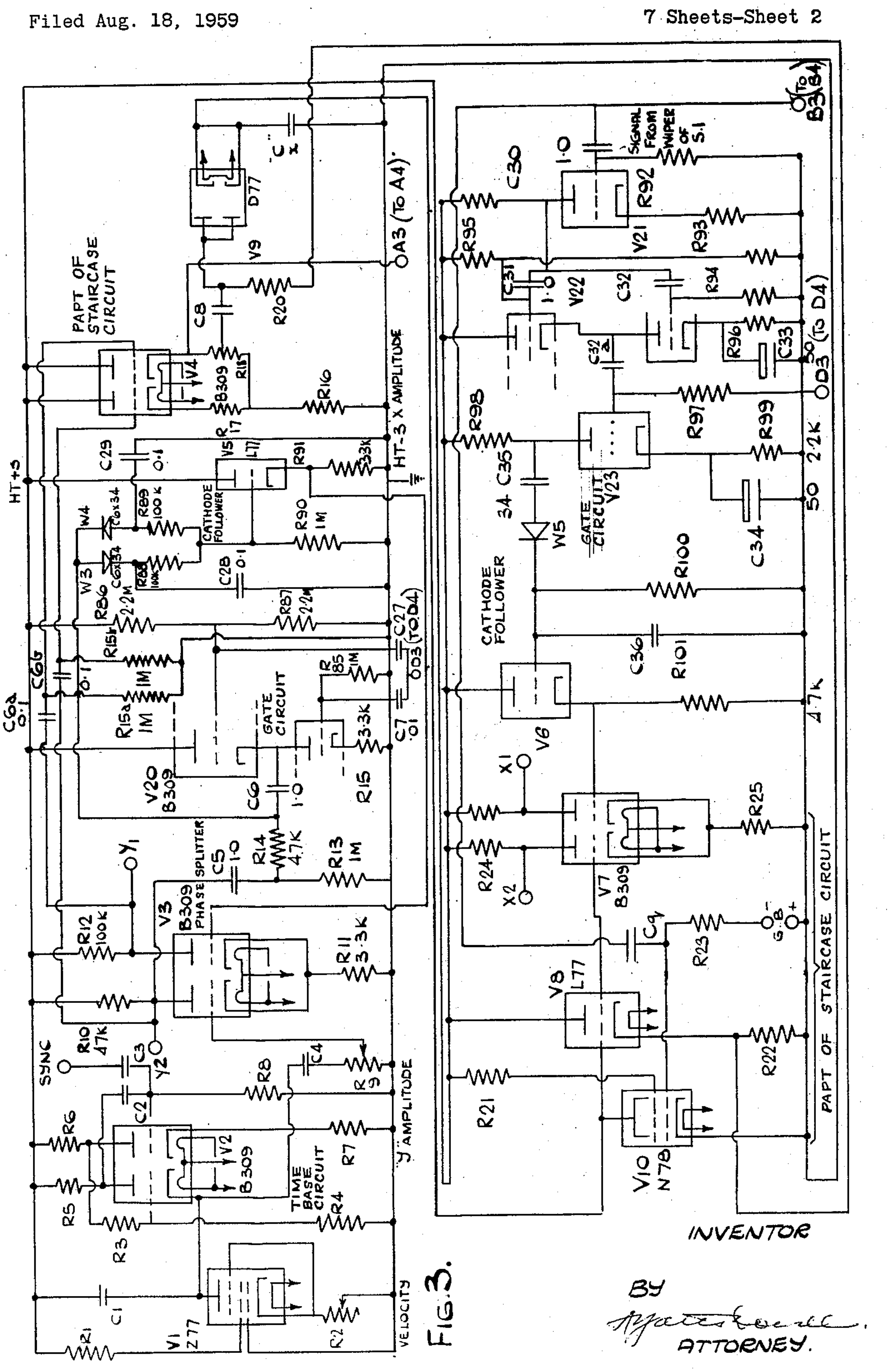
FIGURE 3 is a circuit diagram of part of a scanning circuit for the word scanning tube.

The form of apparatus illustrated in FIGURES 1 to 3 is adapted to read aloud from letter-press in the form of ordinary print or type and for the purposes of the present description it will be assumed that such apparatus is required to have only a small vocabulary so that the sound track elements corresponding to the words of this vocabulary can be accommodated in one or more columns on the face of the vocabulary tube.

The general manner of operation of the apparatus will first be described with reference to FIGURE 1, and thereafter the detailed construction and arrangement of the various assemblies and units and their manner of operation will be described as necessary.

In FIGURE 1 the units designated word scanning tube, power supply, scanning circuit, lens and text comprise the scanning means of the apparatus.

It will be understood that the letter-press unit concerned is placed in a position indicated at 10 relatively to the word scanning cathode ray tube and lens to receive the image of the luminous spot of this tube which is caused to undergo scanning movement in a Y-direction perpendicular to the reading line (the reading line is parallel to the shorter sides of the rectangle 10) and in an X-direction parallel to the reading line, by the "X" and "Y" scanning outputs fed to the deflection plates of the word scanning tube. Light reflected from the surface of the sheet or member bearing the letter-press unit, and which varies in intensity depending upon whether the spot image is incident on a light coloured or white portion of the sheet or member bearing the letter-press unit or upon a dark coloured or black portion of the letter press unit, is intercepted by the photo-multiplier tube which furnishes a primary electrical output having a wave-form of a complex character determined by the number of times which the scanning spot image intersects or passes across the black portions and white portions of the area of each letter-press unit scanned, and by the dimensions and distribution within the area covered by the letter press unit of these black and white portions in the directions of X-scanning and Y-scanning.

This output, although distinctive of a letter-press unit, consisting for example of several letters in succession, is too complex to permit it to be used directly, or with only simple amplification, to control action performing means and consequently it is necessary to simplify the character of the primary electrical output whilst retaining a characteristic which is still distinctive of the letter-press unit scanned.

For this purpose the output from the photo-multiplier tube after amplification in the amplifier 11 is fed to each of a plurality of analyser units arranged in two groups, 12*a* to 12*g* and 12*h* to 12*n* respectively. With each of these analyser units is associated a respective reception unit these being arranged in two corresponding groups 13*a* to 13*g* and 13*h* to 13*n* respectively.

The analyser units are responsive each to a particular frequency or band of frequencies which may be different for each analyser unit, and when such frequency or a frequency contained in said band is present in the primary electrical output the analyser unit concerned produces an output which changes the state of operation of its associated reception unit so that the output to be furnished by such reception unit changes from one value, which may be zero or of a low value, to another and higher value. The other or higher value for each reception unit is so selected that the sum of the outputs of different combinations of reception units in each group is always different from the sum obtained from any other combination.

The resultant output from each group of reception units is utilised to deflect the luminous spot of a vocabulary cathode ray tube by connections from the reception units to respective deflector coils 14 and 15 thereof so that such spot is brought to the start of a particular sound track element, such elements being, for example, arranged in three columns, 16*a*, 16*b* and 16*c* on the face of the tube.

A vocabulary tube control circuit 17 connected to a further deflector coil 18 then produces beam deflection causing the luminous spot to traverse the particular sound track unit to which it has been brought through the operation of the reception unit, and the variations in light intensity are incident upon a photo-sensitive device such as a photo-multiplier tube 19, and after suitable amplification in an audio-amplifier 20 are reproduced audibly by a loud speaker 21.

The scanning circuit 22 of the scanning means is arranged to produce repeated scanning of each letter-press unit so that the analyser units are fed with an output which consists of the wave-form of the primary electrical output, repeated at X-scanning frequency until such time as audible reproduction of the word has been completed, this repeated scanning being controlled by a Dekatron V12 which is operative to cancel the X-scanning output whenever a predetermined number of Y-traces are executed without the scanning spot having traversed a black portion of a letter-press unit, traces selected to be operative for this purpose exceeding in number those which will occur between the letters of a word. For this purpose the output from the amplifier 11 is fed to the Dekatron circuit.

The expression "word" in the preceding paragraph is to be understood to include one-letter words and all letters of the alphabet both capital and small when occurring singly, and all the nine numerals whether occurring singly or grouped to form numbers greater than nine.

Arrangements may be made to enable the apparatus to furnish a distinctive signal or operate automatically to spell out the letters of any word or separate digits of any numeral which is not within its vocabulary as hereinafter specifically described.

In the individual circuit diagrams now referred to terminals which are connected to each other are designated by the same capital letter, preceding a numeral corresponding to the figure number. For example in FIGURES 3 and 4 terminals A3 and A4 are connected as are also B3 and B4, and D3 and D4.

Referring now more particularly to the various units and assemblies included in the apparatus shown in FIGURE 1 there is shown in FIGURE 9 a device for supporting a printed sheet in relation to the word scanning tube 24 and for traversing this sheet horizontally in a continuous manner to bring successive letter-press units into the field of the scanning raster produced by the word scanning tube 24 and lens 26, as well as for periodically shifting the sheet vertically to bring successive lines of the text into the field of the scanning raster.

This device may comprise a carriage 30 which is movable horizontally by means of a lead screw 31 passing through apertured lugs 33 of the body containing nuts or threaded internally, the lead screw 31 being driven by an electric motor 34 through the intermediary of a reduction gear box 35 of any suitable type.

The carriage 30 is constructed to afford a vertically extending guide-way 36 in which is slidably mounted a carrier 37 provided with means such as clamping fingers 38 for securing a printed sheet or complete book or pamphlet which is at the page required to be read on the forward face of the carrier. For simplicity a single sheet 39 is shown whereon successive points of two successive lines are indicated at 39*a* and 39*b*.

Movement of the carrier 37 in the guideways 36 is controlled by a screw threaded pillar 40 which passes through an internally threaded lug or nut integral with or secured to the carrier at its rear, the pillar 40 being journalled rotatably in suitable bearings 41 and 42 in the lower and upper walls of the carriage 30. At its upper end the pillar 40 has mounted on it a pinion 43 which is coupled to the pillar through a free wheel or other one-way clutch device 43*a*. At one side of the periphery of the pinion a rack element is mounted on the body or fixed structure 50 so as to be brought into mesh with the pinion in the last part of the right to left travel of the carriage 30, preferably when the scanning raster is disposed between the right hand word of the reading line and the right hand edge of the sheet.

The rack element 44 is adjustably secured by a clamp 45 and screw 46 so that it can be positionally adjusted lengthwise and thus vary the number of revolutions imparted to the pillar 40 in accordance with the vertical spacing between successive lines of print. If desired a holding pawl 47 can be provided in association with the pinion 43.

Also mounted on the structure 50 are two limit switches preferably of the micro switch type MS1 and MS2, the former having normally closed contacts and the latter normally open contacts.

The operating plungers or projections 51 and 52 of these switches are engageable by the heads of stop screws 53 and 54 carried by spring arms 53*a*, 54*a* on the carriage at opposite ends of its traverse. It will be understood that the screws 53 and 54 may be adjusted relatively to the carriage to vary the position of the latter at which it operates the two switches MS1 and MS2.

The motor 34 is of the D.C. type and is adapted to be energised for rotation in one direction by connection to a low voltage supply at terminal A9, for example +12 volts, and is adapted to be energised for rotation in the opposite direction by connection to another source of voltage of a higher voltage and of the opposite sign, for example—24 volts at terminal B9, both these supplies having a common supply line connected to terminal C9.

The arrangement is such as to provide for slow traverse of the carriage in one direction and return at a higher speed, in the former case the motor being energised from the lower voltage supply at terminal A9, and in the latter case from a supply of opposite polarity at the terminal B9.

This is contrived by providing a relay A/2 having two pairs of double pole contacts designated A1 for one moving contact and A1*a*, A1*b* for the associated fixed contacts. The other double pole contact is designated A2, A2*a* and A2*b*.

Energisation of the relay A/2 is controlled by the micro switch MS2. When the contacts of the micro switch MS2 are open normally closed contacts A1 and A1*a* connect the lower voltage supply from terminal A9 to the motor so that the carriage traverses at a slow speed from right to left and successive words, for example in the line 39*a* are brought within the field of the scanning raster which is arranged to lock on to each successive word to perform scanning thereof and to travel with the carriage during the scanning process in the manner hereinafter described.

At the end of the line 39*a* the micro switch MS2 is closed thus energising the relay A/2 causing the moving contact A1 to separate from the fixed contact A1*a* and to close against the contact A1*b* thereby connecting the higher voltage supply of reverse polarity at the terminal B9 to the motor.

The motor and the lead screw now reverse and return the carriage to its starting position at higher speed.

The closing of A2 with respect to contact A2*b* (holding contacts of the relay A/2) serve to maintain the relay in the operated condition after the contacts of micro switch MS2 have opened upon disengagement of the stop screw from the associated operating plunger 51 of the micro switch.

At the end of the return traverse the normally closed contacts of the micro switch MS1 are opened by engagement of the stop screw 54 with the plunger 52, and therefore the relay coil is de-energised restoring contacts A1 and A2 to the positions shown in the drawings, whereupon the cycle re-commences.

Near the end of the slow forward traverse the pinion 43 engages with the rack element 44 but the free wheel or one-way clutch device 43*a* prevents rotation of the screw-threaded pillar 40. When the carriage 30 has moved sufficiently far to operate the limit-switch MS2 the carriage is driven back and the free wheel or one-way clutch device 43*a* now establishes a driving relation between the pinion 43 and the pillar 40, so that an incremental rotation is imparted to the pillar 40 thereby displacing a carrier 37 upwardly by a distance corresponding to the separation between successive lines of print 39*a*, 39*b*.

It will be evident that some adjustment is required to take into account the different line spacing of different texts and this can be achieved by varying the position of the stop screw 53 by adjustment of spring arm 53*a*.

It will be understood that the threaded pillar 40 is retained against reverse rotation by frictional engagement between it and the carrier 37 or nut associated therewith.

The lens 26 serves to focus an image of the spot of the word-scanning tube upon the sheet bearing the letter-press units and to reduce the spot size incident upon the word to be scanned and thereby improve the discrimination of the scanning means and make the electrical output of the photo-multiplier tube 27 more exactly representative of the letter-press unit scanned. As indicated in FIGURE 1A the lens may comprise a plurality of lens elements 26*a*, 26*b*.

Light from the spot incident upon the sheet or book is scattered or diffusely reflected and some of this light impinges upon the light-sensitive element of the photo-multiplier tube 27 the latter having a sufficiently large area to ensure that notwithstanding the X and Y scanning displacements of the spot, it will always receive the requisite amount of reflected light.

Figure 7:
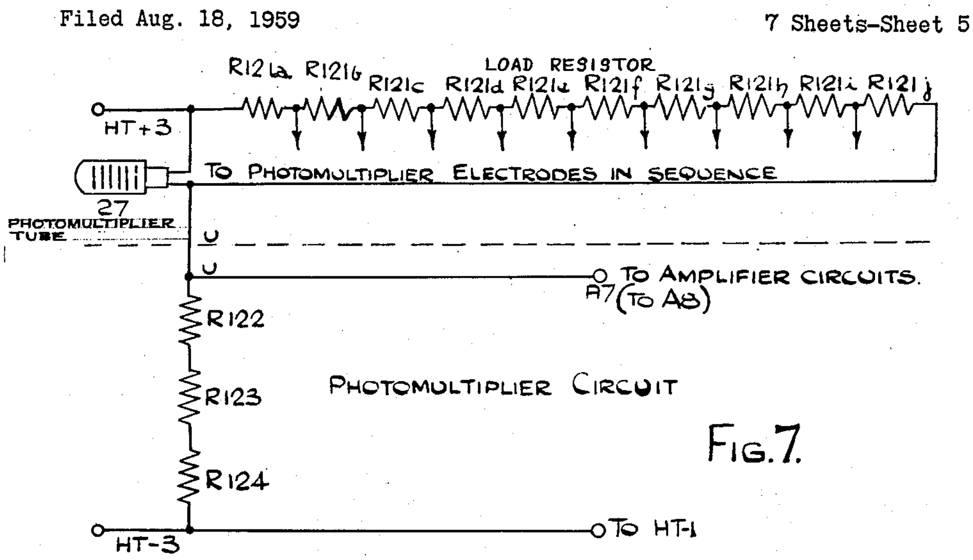
FIGURE 7 is a circuit diagram of the photomultiplier circuit for the photomultiplier tube associated with the word scanning tube.

Referring now to FIGURE 7 illustrating the photo-multiplier circuit associated with the scanning photo-multiplier tube 27, the current variations produced in the photo-multiplier tube during scanning of a letter press unit such as a word produces a fluctuating voltage across the load resistor of this tube, such load resistor comprising the elements R122, R123 and R124.

This output is fed to terminal A7 and thence to terminal A8 in amplifier circuit (FIGURE 8) which includes two amplifier valves V30 and V31 arranged as a conventional resistance coupled amplifier, the anode circuit of the latter valve V31 providing a positive-going output when the spot image is incident upon a white elemental area and a negative-going output when the spot image is incident upon a black elemental area.

The output from valve V31 is fed to terminals B8, C8 and F8.

Terminal B8 is connected to terminal B2 in FIGURE 2 and conveys the output from valve V31 to the analyser circuits of which FIGURE 2 is typical. The function of the analyser circuits and reception circuits connected thereto is to produce a secondary electrical output having a characteristic which is more simple than that of the wave form of the primary electrical output furnished at the terminal B8, but which is still distinctive of the letter-press unit scanned and which may be utilised for direct application to the coils 14, 15 of vocabulary tube 23 to select the corresponding word for reproduction.

Referring now to the scanning circuit illustrated in FIGURE 3, the saw tooth voltage waveform constituting the "Y" scanning output is generated by a generally conventional time base circuit associated with valves V1 and V2, the former valve serving to charge condenser C1 linearly until the potential at the anode of V1 falls to such a value that the multi-vibrator V2 is triggered. C1 then discharges rapidly through V2 and the process repeats. The saw tooth wave-form is amplified by the phase splitter amplifier V3 which produces saw tooth wave-forms of opposite polarity at terminals Y1 and Y2, these being connected to respective Y plates of the word scanning tube.

The output from the left-hand anode of V3 (connected to the Y2 plate of the word scanning tube) is also fed to resistor R13 through condenser C5 and since R13 is connected at its lower end to the HT—3 line, which is earthed, the wave-form developed at the upper end of R13 is symmetrical with respect to earth potential.

The resultant signal at the upper end of R13 is applied through condenser C6 to the cathode of the two halves of valve V20 connected as a "gate" circuit.

Figure 4:
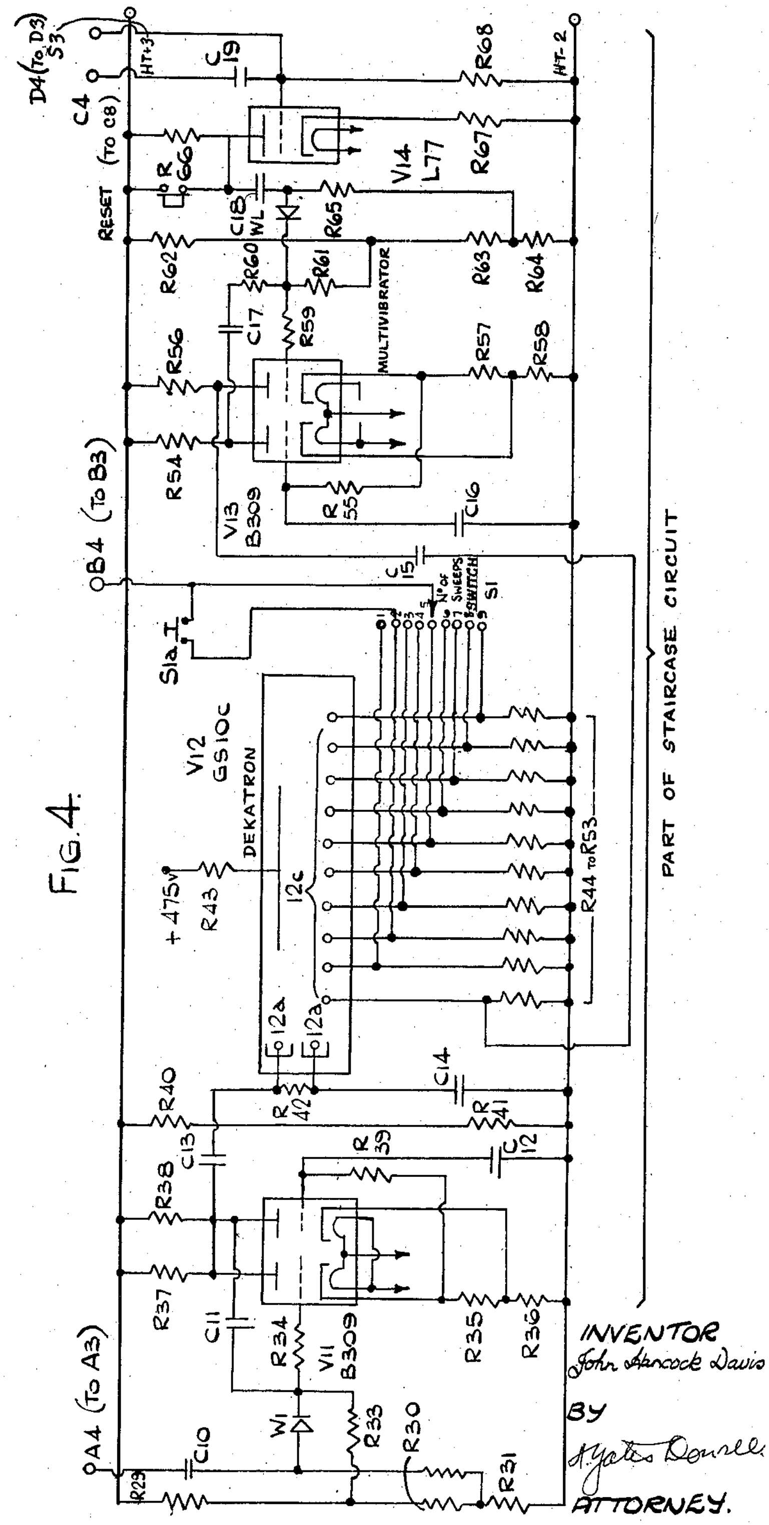
FIGURE 4 is a circuit diagram of a further part of the scanning circuit for the word scanning tube.

The control grids are fed with a signal at terminal D3 through condensers C7 and C27 derived from terminal D4 of the circuit shown in FIGURE 4. The signals present at terminals D4 and D3 are negative-going pulses produced at terminal C8 of the amplifier 11 (FIGURE 8) whenever the scanning spot crosses a black line of the letter-press unit undergoing scanning. The "gate" circuit associated with the valve V20 permits signals to be fed to crystal diodes W3 and W4 whenever there is a negative-going input signal on the terminal D3, but not otherwise.

The circuit operates by virtue of the changes in impedance of the valves V20 when their grid potentials are changed. When the valves are cut "in" they present an extremely low impedance to the incoming signal most of which is therefore dropped across R14. R14 and V20 therefore may be considered as forming a potential divider circuit, the lower half of which is variable in value over a very wide range.

The manner of operation of the "gate" circuit is well understood and is described in "Elements of Pulse Circuits" (on page 131) by F. J. M. Farley, published by Methuen & Co., Ltd., London.

The positive or negative signal from the upper end of R13 is therefore only applied to the diodes W3 and W4 when the scanning spot is crossing a black line on the letter-press unit and W3 and W4 will thus produce D.C. potentials which are positive and negative respectively at the upper ends of their smoothing circuits, comprising respectively resistor R88 and condenser C28 on the one hand, and resistor R89 and condenser C29 on the other hand. These D.C. potentials are added to each other at the lower ends of R88 and R89 and the resultant is applied to the grid of cathode follower valve V5.

The connection from the cathode of V5 to the control grid of the right-hand half of the phase-splitter push-pull amplifier valve V3 controls the level of the D.C. potential of this grid and effects automatic centralising of the saw-tooth scanning appearing at the anodes of V3 and applied to the Y1 and Y2 plates of the word scanning tube.

This is evident from the consideration that if the scanning raster is disposed at too low a position with respect to the line of print, for example, the line 39*a* shown in FIGURE 9, a predominance of signal from the amplifier 11 will be produced during the first half of each saw-tooth element of the Y scanning wave-form (since the spot moves from the upper boundary of the raster in a downward direction and then returns to the upper boundary). Thus signals will be transmitted through the "gate" circuit during the time when the saw-tooth voltage appearing at the upper end of R13 is on the positive-going half of its cycle, whereas to a lesser extent signals will be transmitted in the second half of each saw-tooth (during the negative-going half cycle of the voltage at the upper end of R13).

During the first half of the downward movement of the scanning spot, the upper end of R13 is positive with respect to earth (or HT–3) and during the second half of the downward scan the same point is at a negative potential with respect to earth (or HT–3). During the fly-back movement of the spot these potentials are negative for the first half of the movement, and positive for the second half.

As a result the positive D.C. potential produced by the rectifier W3 at the upper end of its smoothing circuit will be greater than the negative potential produced by the rectifier W4 at the upper end of its smoothing circuit and consequently the potential of the control grid of the cathode follower V5 will tend to be raised as will also the potential of the control grid of the right-hand half of V3.

As a result of this the scanning raster will tend to move downwardly on the face of the word scanning tube, but because of the inversion produced by the lens 26 the raster is raised where it is incident upon the line of print.

It will continue to be so raised until the level of D.C. potential of the upper end of R13 is such as to produce equilibrium conditions in the circuits of the rectifiers W3 and W4 and cathode follower V5, which condition will ensure that the scanning raster is disposed symmetrically or substantially so in the vertical direction with respect to the line of print.

The time constants of the smoothing circuit of R88, C28, and R89, C29 are such that rapid vertical displacements of the scanning raster are avoided whilst achieving correction of any vertical unsymmetrical positioning within a satisfactorily short time, i.e., before scanning of a word has been completed.

The "X" scanning output necessary for causing horizontal movement of the spot in steps co-related with the performance of "Y" scanning traces is generated by a "staircase" circuit consisting of valves V4, V7, V8 and V9 in conjunction with valves V10, V11, V12, V13 and V14 (FIGURE 4) which cause the "X" scanning output to repeat when the end of a word is reached.

The saw-tooth output from the right hand half of V3 anode is fed to the control grid of the right-hand half of V4, which is a cathode follower, and the positive-going part of the saw-tooth wave-form which occurs during the vertical fly-back passes through valve V9 and charges condenser $C_x$ to a small extent.

The condenser $C_x$ thus receives a small increase in charge during every fly-back of the Y-scanning output so that the potential difference across $C_x$ rises in a series of steps. Because of the rise in potential of the plate of $C_x$ which is connected to the cathodes of the diode V9 the effective charging potential would be smaller for each step after the first in a complete cycle of operation if no means were provided to counteract this effect, but it is the function of the valve V8 to raise the potential of the anodes of the diode V9 so that as the number of steps increases the driving pulse of voltage consisting of the Y-scanning signal appearing at the cathode of the right-hand path of V4 "starts" from an increasing level of voltage in correspondence with the increase of such voltage across the condenser $C_x$.

Valve V8 is connected as a cathode follower its control grid being connected directly to condenser $C_x$ and its cathode to the anodes of V9 so that the latter are raised in potential according to that attained across the condenser $C_x$. The steps or vertical parts of the "staircase" wave-form appearing across $C_x$ are therefore substantially constant in amplitude.

The wave-form appearing across $C_x$ is applied to respective plates of the word scanning tube after amplification in the push-pull amplifier V7.

Associated with the "staircase" circuit is a scan-repeat circuit consisting of the valves V10, V11, V12, and V14, the function of which is to reduce the scanning signal that is to say the voltage appearing across the condenser $C_x$ to its starting value in response to the execution of a predetermined number of Y-traces so that upon occurrence of this event the scanning of the word is repeated.

The valve V12 is a dekatron valve which is arranged to supply a positive-going signal to the repeat or discharge valve V10 across the condenser $C_x$.

The stepping on of the glow of the dekatron V12 successively to cathode No. 0 and thence to cathodes Nos. 1 to 9 (these cathodes being shown collectively at **12*c***) successively is effected by the application of a large negative-going pulse to the dekatron electrodes 12*a* indicated at the left-hand end thereof from the multi-vibrator V11, which itself is triggered by positive going pulses derived from the fly-back of the Y-scanning output appearing at terminal $A_3$ (FIGURE 3) and derived from the cathode of the right-hand half of V4, and fed to the multi-vibrator through terminal $A_4$ (FIGURE 4) condenser C10 and through a rectifier *w*1.

Simultaneously negative-going pulses are produced by the photo-multiplier and associated amplifier 11 whenever the scanning spot crosses a black line and these are fed to terminal $C_4$ (FIGURE 4) and hence to the valve V14. These pulses constitute cancelling pulses for preventing the stepping on of the glow of the dekatron beyond cathode No. 0. The incidence of these pulses fed from the anode of valve V14 to the control grid of the right-hand half of V13, which is connected as a multivibrator, produces a large negative-going pulse on cathode No. 0 of the dekatron and resets the glow to zero, overriding the tendency of the pulses from V11 to step on the glow in a forward direction. Thus the dekatron glow is continually being reset to zero so long as the scanning spot encounters printed characters.

When the scanning spot encounters a space where it does not traverse a letter the glow advances to the higher numbered cathodes (i.e. to the right) of the dekatron in succession and if the space between letters is wide enough the glow will advance to the particular cathode to which the "number of sweeps" switch S1 has been set (for example cathode No. 5 as shown in FIGURE 4).

When this occurs a positive-going signal will be applied to terminal $B_4$ (FIGURE 4), thence to terminal $B_3$ (FIGURE 3) and to the control grid of the thyratron valve V10 causing it to conduct and discharge $C_x$. Following this operation the scanning spot will again encounter the beginning of the character previously scanned and the dekatron glow will be continually reset to cathode No. 0 in the series of cathodes 12*c* until the end of the character is again reached.

By varying the setting of the "number of sweeps" switch S1 it is possible to make the scan repeat either at the end of a letter or at the end of a word since the space between words is normally larger than that between letters.

As will be hereinafter mentioned, this facility is useful inasmuch as it enables the name of letters to be read out in the event of a word being scanned for which no sound-track element is provided on the vocabulary tube and thus enables the user to hear the word spelt out.

It will be understood that in employing the device for supporting and feeding the sheet containing the matter to be read as shown in FIGURE 9, the sheet is undergoing continuous traverse in the direction lengthwise of the lines of print, and it is therefore necessary to ensure that the scanning raster will lock on to the words to be read in succession and will travel in a direction lengthwise of the lines with these words whilst performing scanning thereof.

This is achieved by an automatic horizontal shift circuit incorporated in the circuit shown in FIGURE 3 and comprising the valves V21, V22, V23 and associated components which will now be described.

The first valve V21 in this circuit has its control grid connected to terminal B3 which receives an output from terminal B4 of the circuit shown in FIGURE 4, terminal B4 being connected to the slider of the "number of sweeps" switch S1.

This slider will receive a positive-going pulse when the scanning raster commences to scan the line of print starting at a position to the left of the first word in this line. This is due to the fact that the dekatron glow will step on automatically through the series of dekatron cathodes 12*c* so long as no cancelling pulse is derived from multi-vibrator V13, and such cancelling pulse will not appear until the scan spot crosses a black line. Consequently when the glow arrives at the particular cathode to which the slider of S1 is set, e.g. cathode No. 5, the latter will receive a positive-going pulse.

This pulse is amplified and inverted by V21 which thus applies a negative-going pulse to the "gate" circuit of V22 controlling the input to the grid of V23. Such "gate" circuit operates in a similar manner to the "gate" of V20 which has already been referred to.

The grid of V23 is fed from terminal D3 which is connected to terminal D4 of the circuit shown in FIGURE 4 at which the output from the amplifier 11 is present.

This output is transmitted by the "gate" circuit to the rectifier W5 only for the duration of the pulses applied to terminal B3, that is to say, when the dekatron glow has arrived at dekatron cathode No. 5 in the particular setting shown in FIGURE 3.

The signal incident at W5 is applied through cathode follower V6 to the right-hand control grid of V7 (which supplies the X scanning voltage of the scanning raster to the X1 and X2 plates of the word scanning tube).

Thus the output from the cathode follower V6 in effect determines the bias voltage applied to V7 and produces a bodily shift of the scanning raster to the left or to the right, depending upon the sign of the output from V6. In practice increasing output of V6, i.e. positive output, is arranged to shift the scanning raster to the right on the printed sheet. This displacement will continue until an equilibrium condition is reached in which the signal produced in the first vertical traverse of the scannnig spot is just sufficient to maintain positive bias voltage on the grid of V6 at a steady value.

If the shifting circuit is made sufficiently sensitive, the signal produced during the first vertical traverse of the scan will be too small to trigger the multi-vibrator V13 (FIGURE 4) and the dekatron glow will not be reset to cathode No. 0 in the series of cathodes 12*c*, so that the glow will remain on the selected cathode, e.g. cathode No. 5 for the whole of the duration of the first vertical traverse.

Thus the equilibrium position taken up by the scanning raster will be one in which the first vertical traverse of the scan is just touching the leading edge of the word or letter being scanned.

As the word or letter is, in fact, moving the raster will move with it until the word or letter on the one hand, or the raster on the other hand, becomes obscured or rendered inoperative (e.g. by an aperture over the lens or by some other similar masking member). The raster will then drift to the right until it meets the next word in the line.

One advantage of the automatic horizontal shift circuit is that the primary electrical output produced by scanning different occurrences or examples of the same word or letter will be more nearly identical with each other than would be the case were the first sweep of the scanning raster to start at a variable distance from the leading end of the word or letter. This could introduce additional harmonics or differences in the amplitudes of existing harmonics in the characteristic primary electrical signal of a given word or letter, and the elimination of this cause of variation inherently makes it possible to recognise a given word or letter and distinguish it from others in the vocabularly using a reduced number of harmonics for this purpose.

During the scanning of a word vertical traverse of the spot will occur in the inter-letter spaces where no black line is encountered and consequently dekatron glow may be stepped on at these times. In general, however, the setting of the "number of sweeps" switch will be such that fly-back will not occur as a result of spot traverse in inter-letter spaces and the scanning circuit will operate normally.

At the end of the word where the inter-letter space is substantial, the dekatron glow will arrive at the cathode selected by the slider of the "number of sweeps" switch and fly-back in the horizontal direction will occur normally.

Referring now to FIG. 2 which illustrates one of the units contained in the group **12*a*—13*a* to 12*g*—13*g* or 12*h*—13*h* to 12*n*—13*n*** this comprises a filter circuit incorporating a tuned amplifier valve V17 the associated circuit of which is such that the valve provides an output only in response to the presence of one particular frequency in the input applied to the control grid of the left-hand half thereof.

This frequency depends upon values of resistances and condensers in the parallel-T feed-back network of the tuned amplifier comprising resistances R75, R76 and R77 and condensers C23, C24, and C25.

It will be understood that various networks may be employed in this position which will provide either sharp responses to virtually a single frequency as referred to above, or responses of a somewhat broader band as may be desired in any particular case to provide an output requisite for converting the associated reception unit hereinafter described from an inactive condition to an active condition.

The frequency to which the amplifier will respond, i.e., produce an output is the balance frequency of the parallel-T network which is given by the expression $f$ is equal to $$\frac{1}{2\pi CR}$$

cycles per second where C is equal to $C23=C25=$one-half of $C24$ (C being expressed in farads) and R is equal to $R75=R76=$twice $R77$ (R being expressed in ohms).

The manner of operation of a tuned amplifier of this kind is more fully explained in "Electronic and Radio Engineering" by F. E. Terman, chapters 12 and 13, 4th edition published by McGraw-Hill Publishing Co., New York and London, and "Vacuum Tube Amplifiers" (1948), by G. E. Valley and H. Wallman, Chapter 10, to which reference may be had for fuller details.

When the particular frequency to which the amplifier is responsive is present in the input signal it will be amplified and appear at the anode of the right-hand half of V17, this output being rectified by the diode V18 and applied to the control grid of the left-hand half of V19 which, with its associated circuit, constitutes the reception unit.

V19 and its associated circuit operates as a binary bi-stable switch circuit, the values of the circuit components being such that the left-hand half of V19 is normally conducting and the right-hand half is normally cut-off when a low or zero output is applied thereto from the rectifier V18. If however, an output resulting from the presence of the frequency to which V17 is sensitive appears at the slider of R78 the condition of V19 is changed by establishment of the D.C. negative signal on the slider of R78 so that the left-hand half of V19 is changed by establishment of the D.C. negative signal on the slider of R78 so that the left-hand half of V19 is then cut off and the right-hand half rendered conducting, so long as the signal continues.

The cathode circuit of V19 includes a deflection coil L1 the current through which can be set at a predetermined value by any of various expedients, such for example as connecting a variable resistance R80*a* in parallel with this coil, or by varying the grid bias potential applied to the grid bias terminals GB.

The arrangement adopted is that in one of the group of analyser units designated **12*a* to 12*g*, each of which is associated with a respective one of a plurality of reception units designated 13*a* to 13*g*, the current which on energisation of any particular reception unit flows in the coil L1 has a particular value which is one term of a mathematical series such that the summation of any combination of terms of this series produces a unique sum. In a particular arrangement activation of reception unit 13*a* result in its coil L1 carrying a current of 1 amp., a reception unit 13*b* 2 amps., reception unit 13c** 4 amps. and a reception unit numbered $n$ in the series $2^{(n-1)}$ amps.

A similar arrangement is adopted in respect of reception units **13*h*–13*n***.

For providing an aggregation or summation of the currents in the various coils L1 the vocabulary tube 23 may have its coils 14 and 15 sub-divided so that each consists of a number of individual coils such as L1 having separate terminals for connection to a respective reception unit, the magnetic fields being additive.

In an alternative arrangement a single coil 14 may be provided for each of the reception units **13*a*–13*g* and another 15 for each of the reception units 13*h*–13*n*. In this case all the reception units 13*a*–13*g* would be in parallel with the coil 14 and all the reception units 13*h*–13*n* would be in parallel with the coil 15**.

The potentiometer R78 operates as a gain control and may be set to a position such that it is necessary for a particular frequency component to be present in the input to V17 at more than a predetermined level before the output appearing at the slider of R78 will be sufficient to produce change-over of the operating condition of switching circuit incorporating V19.

It would be possible to employ a plurality of units such as are illustrated in FIGURE 2 in which a group of the tuned amplifier circuits are tuned to the same frequency but in which the sliders 78 are set to different positions so that the combination of switching circuits changed-over to the active condition will be different for each word scanned, the selected frequency being for example the second or third harmonic of the fundamental which will normally be equal to the frequency of the X-scanning signal.

The coils 14 and 15 of the vocabulary tube may be arranged to produce deflections of the electron beam in mutually perpendicular directions so that the luminous spot of the cathode ray tube will be brought to the start, that is to say the left-hand end, of the particular sound-track element corresponding to the word which has been scanned.

Figure 8:
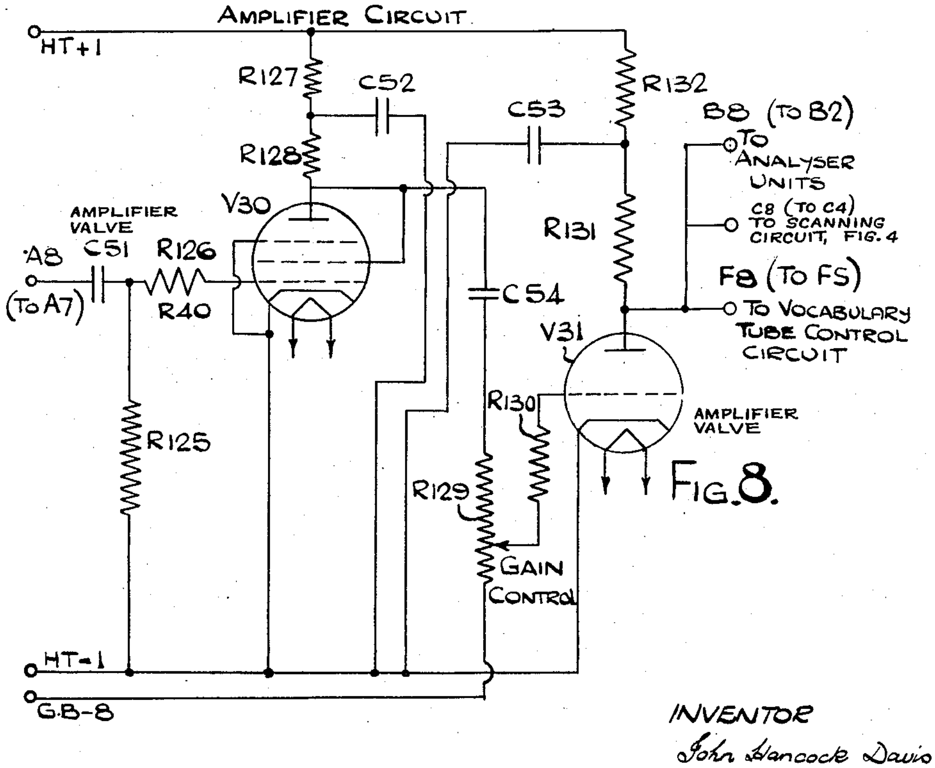
FIGURE 8 is a circuit diagram of the amplifier circuit by means of which the output from the photomultiplier tube in FIGURE 7 is amplified prior to delivery of its output to the analyser units.

Referring now to the circuit of FIGURE 5, terminal F5 thereof is fed with an output from terminal F7 of the amplifier of which the circuit is shown in FIGURE 8. The input to terminal A8 of this amplifier is derived from the photomultiplier tube 27 and associated circuit (FIGURE 7). This output appearing at terminal F8 is applied to the control grid of amplifying valve V24 (FIGURE 5) and thence by resistance-capacity coupling to a second amplifying valve V25. The circuits of these valves have time constants such that incidence of the spot image on the continuous white area occurring at the end of a letter-press unit causes valve V25 to apply a positive voltage pulse via coupling condenser C44 to terminal A5 and thence to the grid of the vocabulary tube 23, thereby causing the spot which is normally extinguished to become illuminated.

Simultaneously the positive voltage applied from the anode circuit of V25 via coupling condenser C23 to the control grid of pentode V26 permits the latter to conduct and charge condenser C45 in its anode circuit, and thereby apply an increasing negative voltage to the X1 plate of the vocabulary tube 23.

Thus, the spot which will at this stage already be situated at the start of the selected sound-tract unit by application of the appropriate current to the coils 14, 15 (voltage from the integrator circuit to the Y-plates), will be deflected along the track and the work which is recorded on the track will be reproduced audibly by a loud-speaker or head-phones.

Figure 6:
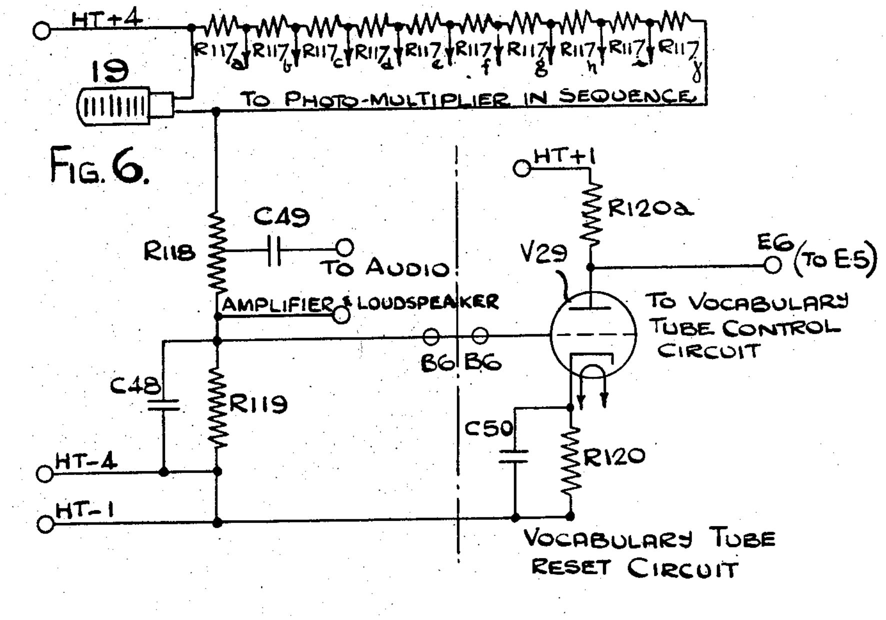
FIGURE 6 is a circuit diagram which includes the vocabulary tube re-set circuit and part of the sound reproduction circuit associated with the vocabulary tube.

Each of the sound-track elements has an end portion of opaque form which produces a long period of low signal voltage from the output of the photomultiplier tube V19 (FIGURE 6).

This output is applied from the positive end of resistor R119 to the vocabulary tube reset circuit via terminals B6—B6 which are joined by a connecting line. The vocabulary tube reset circuit comprises a triode V29 (normally conducting) and producing in response to the application to its control grid of the signal voltage from the terminal B6, a positive pulse from its anode to terminal E6.

Terminal E6 is connected to terminal E5 (FIGURE 5) and thus to the control grid of valve V25 of the vocabulary tube control circuit (FIGURE 5) and to the control grid of a thyratron V27 connected across X scan time base condenser C45. The incidence of a positive pulse at terminal E5 causes the thyratron to conduct and discharge condenser C45 and also causes valve V25 to apply a negative voltage to the grid of pentode V26 to prevent further charging of the condenser C45. Additionally, the negative pulse appearing at the anode V25 and applied to the grid of a vocabulary tube 23 produces black-out of the spot thereof.

The photo-multiplier tube 19 and amplifier 20 and loud-speaker 21 may be of conventional design and need not be further described.

To enable an indication to be furnished when a letter-press unit not in the vocabulary of the apparatus is presented to it on the printed sheet, the face of the vocabulary tube where this is not occupied by sound-track units, may be covered by a distinctive pattern, for example, fine vertical lines with intervening clearer spaces which produce amplitude modulation of the light spot formed on the face of the tube by the cathode ray beam.

Consequently movement of the light spot in relation to this pattern will produce a distinctive output and the spacing of the lines of the pattern may be such that this output is within the audible range, but either above or below frequencies normally employed in audible reproduction of the letter-press units.

The user may then press a push-button switch S1*a* which connects the slider of the "number of sweeps" switch S1 to one of the lower numbered cathodes of the dekatron, for example cathodes 1, 2 or 3.

Under these conditions the apparatus will scan the individual letters or individual numerals of the letter-press unit, and the names of these, being included in the vocabulary, will be then reproduced audibly.

If desired the switch S1*a* may be replaced by a relay with contacts connected between the selected lower numbered cathode and slider for the "number of sweeps" switch S1 the relay being energised in response to the output developed across a filter circuit included in the audio amplifier and tuned to the frequency of the distinctive output furnished by the pattern on the face of the vocabulary tube.

In adapting the apparatus to perform transliteration, for example from an ordinary alphabet into braille, the outputs from a group of reception units such as 13*a*–13*g* may be utilised to control a set of braille embossing plungers.

The arrangement illustrated in FIGURE 10 is for effecting transliteration from the normal alphabet into braille.

When the apparatus is arranged for operation in this manner the vocabulary tube control circuit shown in FIGURE 5 is replaced by a simplified version as illustrated in FIGURE 11. In the latter valves V33 and V34 correspond respectively with valves V24 and V25 of the circuit shown in FIGURE 5 the means for producing the X scanning voltage, namely valves V26, V27 and associated components are omitted.

Thus in the simplified version of the circuit as shown in FIGURE 11, terminal F11 is supplied with output from the amplifier 11 as was the case for terminal F5 in FIGURE 5 and the output produced at A11 is equivalent to that produced at the terminal A5 of the circuit shown in FIGURE 5, namely a brightening pulse to the vocabulary tube grid.

Instead of the control elements being constituted by the sound-track elements of the vocabulary tube 23 in combination with the vocabulary photo-multiplier tube 19, they are constituted by an array of germanium photo-cells Ge, sixty-one in number there being one such photo-cell for each capital letter and each small letter of the normal alphabet and one for each of the numerals 1 to 9.

The germanium cells may be arranged in a plurality of rows as in the case of the sound-track elements 16*a*, 16*b* and 16*c* but are disposed in spaced relation to the vocabulary tube and in front of it. Between the germanium cells Ge and the vocabulary tube may be interposed lens means, indicated diagrammatically as Le in FIGURE 10, to produce an image of the vocabulary tube spot on the particular germanium cell which corresponds to the particular current input to coils 14 and 15 of the vocabulary tube, this in turn depending upon the identity of the letter or numeral scanned.

The sixty-one germanium cells Ge may be connected to thirty-five amplifiers, the leads from the cells corresponding to capital and small versions of the same letter being commoned, the amplifiers being thus designated in the circuit A*a*, B*b*, etc. and an amplifier for one of the numerals being indicated typically at 9. These amplifiers may be of the transistor type.

The thirty-five amplifiers are connected to thirty-five relays, there being one relay for each letter of the normal alphabet and one for each of the numerals 1 to 9, these relays being indicated diagrammatically at A/1, B/2 etc. The braille forming means comprises six punches which may be operated or controlled by solenoids indicated diagrammatically at 1 to 6 (FIGURE 10), energisation of the particular solenoids required to produce a particular letter in the braille alphabet corresponding to the amplifier and relay energised as a result of the particular spot deflection of the vocabulary tube being attained by an appropriate connection of the solenoid energising circuits to the contacts of the relays A/1, B/2 etc. The details of the relay contacts and the various cross connections necessary to attain energisation of the particular selection of braille solenoids 1 to 6 required have not been shown in detail since connections of this character are standard practice in telephone engineering circuits and will be well understood by those skilled in the art. In a general way it is indicated that each of the solenoids 1 to 6 is connected to one terminal of a 50 volt D.C. supply and has its other end connected to a respective bus-bar or line of which there are six in number. Each of the relays A/1, B/2 etc. will have an appropriate number of contacts necessary to effect connection of the other terminal of the 50 volt D.C. supply to the number of bus-bars or lines which require to be energised to produce the braille letter required.

Relay SS/2 is connected in series with the solenoids 1 to 6 and their controlling relay contacts and is of the "slow to operate" type so that its contact SS1 breaks after the braille paper has been embossed.

The operation of contact SS1 causes a positive pulse to be applied to terminal E10 and hence to terminal E11 of the vocabulary tube control circuit (FIGURE 11).

The resultant positive pulse on the control grid of valve V34 of the vocabulary tube control circuit (FIGURE 11) causes V34 to pass a negative pulse to terminal A11 and hence to the vocabulary tube grid thus extinguishing the spot and hence terminating the active condition of the germanium cell amplifier and relay previously actuated. Appropriate solenoids in the series 1 to 6 are thus de-energised and relay SS/2 is also de-energised.

The relay SS/2 has a contact SS2 controlling the energisation of a solenoid for actuating a stepping mechanism for the braille paper actual movement of the paper occuring on de-energisation of this solenoid.

The transmission of a negative pulse from terminal E10 which would occur upon de-energisation of the relay SS/2 is prevented by means of the diode V32 which effectively short circuits such a pulse to earth.

Where the letter-press scanned includes numerals an additional set of relays is used to introduce the "numeral" sign before operation of the braille forming means indicating the actual number.

For word-for-word translation from one language to another the sound-track elements would have applied thereto recordings of the words of the language to which translation is required to be effected corresponding most nearly in meaning to words of the first said language.

Further, it will be understood that the circuit arrangements illustrated in FIGURE 10 may be applied with minor modification to the apparatus to adapt same for word-for-word translation where printed or typed reproduction is required. For example in this case the number of germanium cells and amplifiers required would be equal to the vocabulary of the apparatus and activation of a particular cell and associated amplifier would result in energisation of a solenoid controlling or operating means for typing or prinitng the particular word required upon a sheet, the latter being stepped on in the same manner as indicated in connection with FIGURE 10.

The necessary power supply circuits for furnishing the high tension, low tension and grid bias leads required may be of conventional form and for this reason are not illustrated in detail.

Table 1 shows the voltages required for the several high-tension, low-tension, and grid bias leads or terminals indicated in the circuit diagrams.

The remaining Tables 2 to 11 set out details as the outputs and values of the circuit components which have been found to produce satisfactory results in practice. It will, however, be understood that those skilled in the art will readily be able to obtain modification of the performance of any circuit or part thereof by appropriate variation of the values of these components having regard to the description hereinbefore set forth as to the manner of operation.

TABLE 1

*Power Supplies*

| Designation: | Value |
|---|---|
| *HT*+1 | 250 volts. |
| *HT*+2 | 330–360 volts. |
| *HT*+3 | 1,000 volts (1,100 volts max.). |
| *HT*+4 | 1,000 volts (1,100 volts max.). |
| *LT*+1 | 6.3 volts A.C. |
| *LT*+2 | 50 volts D.C. |
| *GB*—1 | —15 volts. |
| *GB*—2 | —50 volts. |
| *GB*—3 | —1.5 volts. |
| *GB*—4 | —37.5 volts. |
| *GB*—5 | —12 volts. |
| *GB*—6 | —6 volts. |
| *GB*—7 | —6 volts. |
| *GB*—8 | —4.5 volts. |
| *GB*—9 | —3.0 volts. |

TABLE 2

*Resistors (FIGURES 2, 3 and 4)*

| | |
|---|---|
| R1 | 33K |
| R2 | 100K |
| R3 | 47K |
| R4 | 1M |
| R5 | 4.7K |
| R6 | 4.7K |
| R7 | 2.2K |
| R8 | 470K |
| R9 | 500K |
| R10 | 47K |
| R11 | 3.3K |
| R12 | 100K |
| R13 | 1MK |
| R14 | 47K |
| R15 | 3.3K |
| R16 | 3.3K |
| R17 | 22K |
| R18 | 10K |
| R19 | 1M |
| R20 | 4.7M |
| R21 | 22K |
| R15*a* | 1M |
| R15*b* | 1M |
| R22 | 47K |
| R23 | 2.2M |
| R24 | 47K |
| R25 | 3.3K |
| R26 | 100K |
| R27 | 3.3M |
| R28 | 100K |
| R29 | 220K |
| R30 | 6.8K |
| R31 | 12K |
| R32 | 470K |
| R33 | 680K |
| R34 | 100K |
| R35 ohms | 470 |
| R36 | 6.8K |
| R37 | 15K |
| R38 | 33K |
| R39 | 10K |
| R40 | 150K |
| R41 | 22K |
| R42 | 18K |
| R43 | 680K |
| R44 | 220K |
| R45 | 220K |
| R46 | 220K |
| R47 | 220K |
| R48 | 220K |
| R49 | 220K |
| R50 | 220K |
| R51 | 220K |
| R52 | 220K |
| R53 | 220K |
| R54 | 33K |
| R55 | 10K |
| R56 | 15K |
| R57 ohms | 470 |
| R58 | 6.8K |
| R59 | 100K |
| R60 | 470K |
| R61 | 680K |
| R62 | 220K |
| R63 | 6.8K |
| R64 | 12K |
| R65 | 470K |
| R66 | 22K |
| R67 ohms | 470 |
| R68 | 1M |
| R69 | 1M |
| R70 | 3.3K |

TABLE 2—Continued

| | |
|---|---|
| R71 | 33K |
| R72 | ----- |
| R73 | ----- |
| R74 | ----- |
| R75 | [1] |
| R76 | [1] |
| R77 | [1] |
| R78 | 1M |
| R79 | 100K |
| R80 | 1K |
| R81 | 10K |
| R82 | 10K |
| R83 | 100K |
| R84 | 1M |
| R85 | 1M |
| R86 | 2.2M |
| R87 | 2.2M |
| R88 | 100K |
| R89 | 100K |
| R90 | 1M |
| R91 | 3.3K |
| R92 | 1M |
| R93 | 2.2K |
| R94 | 2.2M |
| R95 | 2.2M |
| R96 | 2.2K |
| R97 | 100K |
| R98 | 100K |
| R99 | 2.2K |
| R100 | 1M |
| R101 | 47K |

[1] See col. 11, line 27.
K=1000 ohms. M=$10^6$ ohms.

TABLE 3

*Condensers (FIGURES 2, 3, and 4)*

| | | |
|---|---|---|
| C1 | mfd | .03 |
| C2 | pF | 200 |
| C3 | mfd | .01 |
| C4 | mfd | .5 |
| C5 | mfd | 1.0 |
| C6 | mfd | 1.0 |
| C7 | mfd | .01 |
| C6*a* | mfd | 0.1 |
| C6*b* | mfd | 0.1 |
| C8 | pF | 500 |
| C9 | mfd | .1 |
| C10 | pF | 500 |
| C11 | mfd | .01 |
| C12 | mfd | .001 |
| C13 | mfd | .02 |
| C14 | mfd | .001 |
| C15 | mfd | .001 |
| C16 | mfd | .001 |
| C17 | mfd | .01 |
| C18 | mfd | .1 |
| C19 | mfd | .1 |
| C20 | mfd | .5 |
| C21 | mfd | 50 |
| C22 | mfd | .5 |
| C23 | | [1] |
| C24 | | [1] |
| C25 | | [1] |
| C26 | mfd | .1 |
| C27 | mfd | 0.1 |
| C28 | mfd | 0.1 |
| C29 | mfd | 0.1 |
| C30 | mfd | 1.0 |
| C31 | mfd | 1.0 |
| C32 | mfd | 1.0 |
| C32*a* | mfd | 1.0 |
| C33 | mfd | 50 |
| C34 | mfd | 50 |
| C35 | mfd | 0.1 |
| C36 | mfd | 1.0 |

[1] See col. 11, line 27.
Mfd.=capacity in microfarads. pF.=capacity in picrofarads.

TABLE 4

*Vocabulary Tube Control Circuit (FIGURE 5)*

| Condensers: | | Mfd. |
|---|---|---|
| C37 | | 1.0 |
| C38 | | 0.04 |
| C39 | | 50 |
| C40 | | 0.5 |
| C41 | | 0.5 |
| C42 | | 0.5 |
| C43 | | 0.5 |
| C44 | | 0.5 |
| C45 | | 1.0 |
| C46 | | 50 |
| C47 | | 0.25 |
| Resistors: | | |
| R102 | | 470K |
| R103 | ohms | 300 |
| R104 | | 6.8K |
| R105 | | 470K |
| R106 | | 6.8K |
| B107 | ohms | 300 |
| R108 | | 470K |
| R109 | | 47K |
| R110 | | 50K |
| R111 | | 3.3K |
| R112 | | 47K |
| R113 | | 50K |
| R114 | | 47K |
| R115 | | 2.2K |
| R116 | | 250K |

TABLE 5

*Line Scan Release Circuit and Part of Sound Reproduction Circuit (FIGURE 5)*

| Condensers: | Mfd. |
|---|---|
| C48 | 0.0025 |
| C49 | 0.0003 |
| C50 | 0.2 |
| Resistors: | |
| R117*a*–R117*j* | 47K each. |
| R118 | 50K. |
| R119 | 100K. |
| R120*a* | 10K. |
| R120 | 2.2K |

TABLE 6

*Photo-Multiplier Circuit (FIGURE 7)*

| Resistors: | |
|---|---|
| R121*a*–R121*j* | 47K each. |
| R122 | 47K. |
| R123 | 33K. |
| R124 | 100K. |

TABLE 7

*Amplifier Circuit (FIGURE 8)*

| Condensers: | | Mfd. |
|---|---|---|
| C51 | | 1.0 |
| C52 | | 8.0 |
| C53 | | 8.0 |
| C54 | | 1.0 |
| Resistors: | | |
| R125 | | 100K |
| R126 | ohms | 330 |
| R127 | | 6.8K |
| R128 | | 4.7K |
| R129 | | 100K |
| R130 | ohms | 330 |
| R131 | | 10K |
| R132 | | 10K |

TABLE 8

*Transliteration Circuit (FIGURE 10)*

| | |
|---|---|
| Condensers: | Mfd. |
| C55 | 0.1 |
| C56 | 2.0 |
| C57 | 2.0 |
| C58 | 2.0 |
| C59 | 2.0 |
| C60 | 2.0 |
| C61 | 2.0 |
| Resistors: | |
| R133 | 100K |
| R134 | 1M |
| R135 | 2.5K |
| R136 | 10K |
| R137 | 10K |
| R138 | 2.2K |
| R139 ohms | 20 |
| R140 do | 20 |
| R141 do | 20 |
| R142 do | 20 |
| R143 do | 20 |
| R144 do | 20 |

TABLE 9

*Vocabulary Tube Control Circuit (Modified for Transliteration) (FIGURE 11)*

| | |
|---|---|
| Condensers: | Mfd. |
| C62 | 0.04 |
| C63 | 1.0 |
| C64 | 50 |
| C65 | 0.5 |
| C66 | 50 |
| Resistors: | |
| R145 | 470K |
| R146 | 6.8K |
| R147 ohms | 300 |
| R148 | 470K |
| R150 | 6.8K |

What I claim then is:

1. Apparatus of the character described responsive to letter-press comprising, photo-sensitive scanning means including means for forming a scanning spot of a size substantially smaller than a letter-press unit to be scanned, and means for imparting a plurality of successive scanning traces to said spot each traversing a respective elemental part of said letter-press unit, means for producing in response to said scanning traces successive electrical signals pertaining to said elemental parts respectively and collectively forming in respect of a series of letter-press units a primary electrical output comprising successive primary signal groups pertaining to respective letter-press units and each having a complex wave form involving a plurality of amplitude variations within a time interval equal to the scanning time for each complete scan of a letter-press unit, conversion means including responsive means sensing a wave form parameter of each primary signal group, and signal producing means connected therewith and furnishing a series of secondary electrical signal portions of generally similar wave form and attaining a magnitude dependent upon said parameter and which is unique to a particular letter-press unit and resultant primary signal group, means for temporarily sustaining said secondary electrical signal portions successively at said magnitudes, a plurality of means for performing respective different actions corresponding to respective letter-press units, and selector means responsive to the magnitude of each of said portions of said secondary electrical signal portions and controlling operation of said means for performing respective different actions.

2. Apparatus of the character described responsive to letter-press comprising, photo-sensitive scanning means including means for forming a scanning spot of a size substantially smaller than a letter-press unit to be scanned, and means for imparting a plurality of successive scanning traces to said spot each traversing a respective elemental part of said letter-press unit, means for producing in response to said scanning traces successive electrical signals pertaining to said elemental parts respectively and collectively forming in respect of a series of letter-press units a primary electrical output comprising successive primary signal groups pertaining to respective letter-press units and each having a complex wave form involving a plurality of amplitude variations within a time interval equal to the scanning time for each complete scan of a letter-press unit, conversion means including frequency analyser means comprising a plurality of analyser means comprising a plurality of analyser units sensitive to the presence of respective frequencies in said primary electrical output, said conversion means further including a plurality of circuits connected with respective analyser units and incorporating means responsive to reception of an output from the associated analyser unit for generating respective outputs of respective predetermined magnitudes such that different combinations thereof always produce a secondary electrical signal portion unique in magnitude to a particular one of said combinations, means for combining said circuit outputs, a plurality of means for performing respective different actions corresponding to respective letter-press units, and selector means connected to the last said circuits to receive their outputs combined and responsive to the magnitude thereof to control selectively operation of said means for performing respective different actions.

3. Apparatus of the character described responsive to letter-press comprising, photo-sensitive scanning means including means for forming a scanning spot of a size substantially smaller than a letter-press unit to be scanned, and means for imparting a plurality of successive scanning traces to said spot each traversing a respective elemental part of said letter-press unit, means for producing in response to said scanning traces successive electrical signals pertaining to said elemental parts respectively and collectively forming in respect of a series of letter-press units a primary electrical output comprising successive primary signal groups pertaining to respective letter-press units and each having a complex wave form involving a plurality of amplitude variations within a time interval equal to the scanning time for each complete scan of a letter-press unit, conversion means including frequency analyser means comprising a plurality of analyser units each including a filter circuit responsive only to the presence of a narrow band of frequencies to produce an output, said conversion means further including a plurality of circuits, means incorporated therein responsive to the reception of output from a respective one of said analyser units connected thereto for generating respective outputs of predetermined magnitudes such that different combinations thereof always produce a secondary electrical signal portion unique in magnitude to a particular one of said combinations, means for combining said outputs from the last said circuits, a plurality of means for performing respective different actions corresponding to respective letter-press units, and selector means connected to the last said circuits to receive their outputs combined and responsive to the magnitude thereof to control selectively operation of said means for performing respective different actions.

4. Apparatus of the character described responsive to letter-press comprising, photo-sensitive scanning means including means for forming a scanning spot of a size substantially smaller than a letter-press unit to be scanned, and means for imparting a plurality of successive scanning traces to said spot each traversing a respective elemental part of said letter-press unit, means for producing in response to said scanning traces successive electrical signals pertaining to said elemental parts respectively and collectively forming in respect of a series of letter-press units a primary electrical output comprising successive primary signal groups pertaining to respective letter-press units and each having a complex wave form involving a plurality of amplitude variations within a time interval equal to the scanning time for each complete scan of a letter-press unit, conversion means including frequency analyser means comprising a plurality of analyser units each including a filter circuit responsive only to the presence of a narrow band of frequencies to produce an output, said conversion means further including a plurality of switching circuits settable in one or another of different states of operation in response to the reception of output from a respective one of said analyser units connected thereto, said switching circuits themselves including means for generating respective outputs of a magnitude such that different combinations thereof always produce a secondary electrical signal portion unique in magnitude to a particular one of said combinations, means for combining said outputs of the last said circuits, means for performing respective different actions corresponding to respective letter-press units, and selector means connected to the last said circuits to receive their outputs combined and responsive to the magnitude thereof to control selectively operation of said means for performing respective different actions.

5. Apparatus of the character described responsive to letter-press comprising, photo-sensitive scanning means including means for forming a scanning spot of a size substantially smaller than a letter-press unit to be scanned, and means for imparting a plurality of successive scanning traces to said spot each traversing a respective elemental part of said letter-press unit, means for producing in response to said scanning traces successive electrical signals pertaining to said elemental parts respectively and collectively forming in respect of a series of letter-press units a primary electrical output comprising successive primary signal groups pertaining to respective letter-press units and each having a complex wave form involving a plurality of amplitude variations within a time interval equal to the scanning time for each complete scan of a letter-press unit, conversion means including frequency analyser means comprising a plurality of analyser units each including a filter circuit responsive only to the presence of a narrow band of frequencies to produce an output, said conversion means further including a plurality of switching circuits settable in one or another of different states of operation in response to the reception of output from a respective one of said analyser units connected thereto, said switching circuits themselves furnishing respective outputs of magnitudes corresponding to respective terms of a mathematical series whereof summation of any combination of terms differs from summation of all other combinations of terms for combining said switching circuit outputs, a plurality of means for performing respective different actions corresponding to respective letter-press units, and selector means connected to said switching circuits to receive their outputs combined and responsive to the magnitude thereof to control selectively operation of said means for performing said respective different actions.

6. Apparatus of the character described responsive to letter-press comprising, photo-sensitive scanning means including means for forming a scanning spot of a size substantially smaller than a letter-press unit to be scanned, and means for imparting a plurality of successive scanning traces to said spot each traversing a respective elemental part of said letter-press unit, means for producing in response to said scanning traces successive electrical signals pertaining to said elemental parts respectively and collectively forming in respect of a series of letter-press units a primary electrical output comprising successive primary signal groups pertaining to respective letter-press units and each having a complex wave form involving a plurality of amplitude variations within a time interval equal to the scanning time for each complete scan of a letter-press unit, conversion means including frequency analyser means comprising a plurality of analyser units each including a filter circuit responsive only to the presence of a narrow band of frequencies to produce an output, said conversion means further including a plurality of switching circuits settable in one or another of different states of operation, in response to the reception of output from a respective one of said analyser units connected thereto, said switching circuits themselves furnishing respective outputs of a magnitude corresponding to a respective term of the series 1, 2, 4, 8, . . . $2^n$, means for combining said switching circuit outputs, a plurality of different means for performing respective different actions corresponding to respective letter-press units, and selector means connected to said switching circuits to receive their outputs combined and responsive to the magnitude thereof to control selectively operation of said means for performing respective different actions.

7. Apparatus of the character described responsive to letter-press comprising, photo-sensitive scanning means including means for forming a scanning spot of a size substantially smaller than a letter-press unit to be scanned, and means for imparting a plurality of successive scanning traces to said spot each traversing a respective elemental part of said letter-press unit, means for producing in response to said scanning traces successive electrical signals pertaining to said elemental parts respectively and collectively forming in respect of a series of letter-press units a primary electrical output comprising successive primary signal groups pertaining to respective letter-press units and each having a complex wave form involving a plurality of amplitude variations within a time interval equal to the scanning time for each complete scan of a letter-press unit, conversion means including frequency analyser means comprising a plurality of analyser units each including a filter circuit responsive only to the presence of a narrow band of frequencies to produce an output, said conversion means further including a plurality of bi-stable electronic switching circuits changeable from one stable state to another in response to the reception of output from a respective one of said analyser units connected thereto, said switching circuits themselves furnishing respective outputs of a magnitude such that different combinations thereof always produce a secondary electrical signal portion unique in magnitude to a particular one of said combinations, means for combining said switch circuit outputs, means for performing different actions corresponding to respective letter-press units, and selector means connected to said switching circuits to receive their outputs combined and responsive to the magnitude thereof to control selectively operation of said means for performing respective different actions.

8. Apparatus of the character described responsive to letter-press comprising, photo-sensitive scanning means including means for forming a scanning spot of a size substantially smaller than a letter-press unit to be scanned, and means for imparting a plurality of successive scanning traces to said spot each traversing a respective elemental part of said letter-press unit, means for producing in response to said scanning traces successive electrical signals pertaining to said elemental parts respectively and collectively forming in respect of a series of letter-press units a primary electrical output comprising successive primary signal groups pertaining to respective letter-press units and each having a complex wave form involving a plurality of amplitude variations within a time interval equal to the scanning time for each complete scan of a letter-press unit, conversion means including frequency analyser means comprising a plurality of analyser units each including an amplifying filter circuit having gain control means and responsive only to the presence of a narrow band of frequencies to produce an output, said conversion means further including a plurality of circuits connected with respective analyser units to receive outputs therefrom and incorporating means responsive to the incidence of said outputs from said filter circuits at a predetermined level for generating respective outputs of a magnitude such that different combinations thereof always produce a secondary electrical signal portion unique in magnitude to a particular one of said combinations, means for combining said outputs of the last said circuits, a plurality of means for performing respective different actions corresponding to respective letter-press units, and selector means connected to the last said circuits to receive their outputs combined and responsive to the magnitude thereto to control selectively the operation of said means for performing respective different actions.

9. Apparatus of the character described responsive to letter-press comprising, means for supporting a sheet bearing letter press units, photo-sensitive scanning means including means for forming a scanning spot of a size substantially smaller than each letter-press unit to be scanned, and means for imparting a plurality of successive scanning traces in one direction to said spot means for effecting relative movement in a direction transverse to said one direction and at a speed slower than that at which said scanning traces are executed so that each scanning trace traverses a respective elemental part of said letter-press unit, means for producing in response to said scanning traces successive electrical signals pertaining to said elemental parts respectively and collectively forming in respect of a series of letter-press units a primary electrical output comprising successive primary signal groups pertaining to respective letter-press units and each having a complex wave form involving a plurality of amplitude variations within a time interval equal to the scanning time for each complete scan of a letter-press unit, conversion means including frequency analyser means comprising a plurality of analyser units sensitive to the presence of respective frequencies in said primary electrical output, said conversion means further including a plurality of circuits connected with respective analyser units and incorporating means responsive to reception of an output from an associated analyser unit for generating respective outputs of predetermined different magnitudes such that different combinations thereof always produce a secondary electrical signal portion unique in magnitude to a particular one of said combinations, a magnetic field structure including winding means connected with the last said circuits to establish a magnetic field of a strength determined by their combined outputs, a plurality of means for performing respective different actions corresponding to respective letter-press units, and selector means responsive to the strength of said magnetic field to control selectively operation of said means for performing respective different actions.

10. Reading apparatus responsive to letter-press units comprising, photo-sensitive scanning means including means for forming a scanning spot of a size substantially smaller than a letter-press unit to be scanned, and means for imparting a plurality of successive scanning traces to said spot each traversing a respective elemental part of said letter-press unit, means for producing in response to said scanning traces successive electrical signals pertaining to said elemental parts respectively and collectively forming in respect of a series of letter-press units a primary electrical output comprising successive primary signal groups pertaining to respective letter-press units and each having a complex wave form involving a plurality of amplitude variations within a time interval equal to the scanning time for each complete scan of a letter-press unit, a conversion means including responsive means sensing a wave-form parameter of each primary signal group, and signal producing means connected therewith for furnishing a series of secondary electrical signal portions of generally similar wave form and attaining a magnitude which is unique to a particular letter-press unit and dependent upon said parameter, means for temporarily sustaining said secondary electrical signal portions at said magnitudes, a cathode ray tube, a plurality of sound track elements bearing sound tracks of words corresponding to respective ones of said letter-press units, means for mounting same in organised spaced relation and in the path of light from a luminous area on the face of said tube, said tube having beam deflection means connected with said conversion means to position said beam and hence said luminous area at a location determined by the value of said secondary electrical signal portions, and photo-sensitive means disposed in the path of light from said sound track element to furnish an electrical output corresponding to the markings of said sound track elements.

11. Reading apparatus responsive to letter-press comprising, photo-sensitive scanning means including means for forming a scanning spot of a size substantially smaller than a letter-press unit to be scanned, and means for imparting a plurality of successive scanning traces to said spot each traversing a respective elemental part of said letter-press unit, means for producing in response to said scanning traces successive electrical signals pertaining to said elemental parts respectively and collectively forming in respect of a series of letter-press units a primary electrical output comprising successive primary signal groups pertaining to respective letter-press units and each having a complex wave form involving a plurality of amplitude variations within a time interval equal to the scanning time for each complete scan of a letter-press unit, a conversion means including responsive means sensing a wave-form parameter of each primary signal group and signal producing means connected therewith for furnishing a series of secondary electrical signal portions of generally similar wave-form and attaining a magnitude which is dependent upon said parameter and which is unique to a particular letter-press unit and resultant primary signal group, means for temporarily sustaining said secondary electrical signal portions at said magnitudes, and a plurality of sound track elements, having markings corresponding to respective words of a vocabulary, means for mounting said sound track elements in organised spaced relation, means for establishing a light beam, electrically controlled means for changing the position thereof and connected with said conversion means to position said light beam in incident relation with one of said sound track elements determined by one of said secondary electrical signal portions, photo-sensitive means producing an electrical output corresponding to the markings of said sound track elements, and mounted in the light path therefrom, sound reproducing means connected to said photo-sensitive means, and means for exposing said photo-sensitive means to successive portions of that one of said sound track elements upon which said light beam is incident.

12. Apparatus of the character described responsive to letter-press comprising, photo-sensitive scanning means including means for forming a scanning spot of a size substantially smaller than a letter-press unit to be scanned, and means for imparting a plurality of successive scanning traces to said spot each traversing a respective elemental part of said letter-press, said traces collectively forming a scanning raster, means for supporting a sheet bearing said letter-press, means for shifting said supporting means and said photo-sensitive scanning means relatively to each other in a direction cross-wise of the traces of said scanning raster, and means for temporarily maintaining said scanning raster incident on a respective letter-press unit undergoing scanning, means for producing in response to said scanning traces successive electrical signals pertaining to said elemental parts respectively and collectively forming in respect of a series of letter-press units a primary electrical output comprising successive primary signal groups pertaining to respective letter-press units and each having a complex wave form involving a plurality of amplitude variations within a time interval equal to the scanning time for each complete scan of a letter-press unit, conversion means including responsive means sensing a wave-form parameter of each primary signal group and signal producing means connected therewith for furnishing a series of secondary electrical signal portions of generally similar wave-form and attaining a magnitude which is dependent upon said parameter and which is unique to a particular letter-press unit and resultant primary signal group, means for temporarily sustaining said secondary electrical signal portions at said magnitudes, a plurality of means for performing respective different actions corresponding to respective letter-press units, and selector means responsive to variation of said secondary electrical signal portions for controlling selectively operation of said means for performing respective different actions.

13. Apparatus of the character described responsive to letter-press comprising, photo-sensitive scanning means including means for forming a scanning spot of a size substantially smaller than a letter-press unit to be scanned and means for imparting a plurality of successive scanning traces to said spot each traversing a respective elemental part of said letter-press unit, said traces collectively forming a scanning raster, means for supporting a sheet bearing said letter-press, means for shifting said supporting means and said photo-sensitive scanning means relatively to each other in a direction cross-wise of the traces of said scanning raster, means for centralising said scanning raster in a direction lengthwise of said traces and with respect to said letter-press, means for producing in response to said scanning traces successive electrical signals pertaining to said elemental parts respectively and collectively forming in respect of a series of letter-press units a primary electrical output comprising successive primary signal groups pertaining to respective letter press units and each having a complex wave form involving a plurality of amplitude variations within a time interval equal to the scanning time for each complete scan of a letter-press unit, a conversion means including responsive means sensing a wave-form parameter of each primary signal group and signal producing means connected therewith for furnishing a series of secondary electrical signal portions of generally similar wave-form and attaining a magnitude which is dependent upon said parameter and which is unique to a particular letter-press unit and resultant primary signal group, means for temporarily sustaining said secondary electrical signal portions at said magnitudes, a plurality of different means for performing respective different actions corresponding to respective letter-press units, and selector means responsive to variation of said secondary electrical signal portions for controlling selectively operation of said means for performing different respective actions.

References Cited in the file of this patent

UNITED STATES PATENTS

| | | |
|---|---|---|
| 2,457,456 | Flory | Dec. 28, 1948 |
| 2,501,788 | Ross | Mar. 28, 1950 |
| 2,517,102 | Flory | Aug. 1, 1950 |
| 2,518,694 | Jannupoulo | Aug. 15, 1950 |
| 2,540,660 | Dreyfus | Feb. 6, 1951 |
| 2,646,465 | Davis et al. | July 21, 1953 |
| 2,685,615 | Biddulph et al. | Aug. 3, 1954 |
| 2,759,045 | Young | Aug. 14, 1956 |
| 2,907,833 | Mauch | Oct. 6, 1959 |
| 2,961,649 | Eldredge et al. | Nov. 22, 1960 |
| 2,991,369 | Grewe | July 4, 1961 |

UNITED STATES PATENT OFFICE
CERTIFICATE OF CORRECTION

Patent No. 3,114,980 December 24, 1963

John Hancock Davis

It is hereby certified that error appears in the above numbered patent requiring correction and that the said Letters Patent should read as corrected below.

In the heading to the printed specification, lines 4 and 5, for "76 Farquhar Road, Edgbaston, Birmingham, England" read -- Birmingham, England (51 Ridsdale Road, Sherwood, Nottingham, England) --.

Signed and sealed this 22nd day of September 1964.

(SEAL)
Attest:

ERNEST W. SWIDER
Attesting Officer

EDWARD J. BRENNER
Commissioner of Patents